(12) United States Patent
Kalish et al.

(10) Patent No.: US 10,421,227 B2
(45) Date of Patent: Sep. 24, 2019

(54) SHIM-STACK FOAMING DIE

(71) Applicant: 3M INNOVATIVE PROPERTIES COMPANY, St. Paul, MN (US)

(72) Inventors: Jeffrey P. Kalish, St. Paul, MN (US); James M. Jonza, Woodbury, MN (US); William J. Kopecky, Hudson, WI (US); Bryan C. Feisel, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 320 days.

(21) Appl. No.: 15/517,022

(22) PCT Filed: Oct. 20, 2015

(86) PCT No.: PCT/US2015/056385
§ 371 (c)(1),
(2) Date: Apr. 5, 2017

(87) PCT Pub. No.: WO2016/064819
PCT Pub. Date: Apr. 28, 2016

(65) Prior Publication Data
US 2017/0246785 A1   Aug. 31, 2017

Related U.S. Application Data

(60) Provisional application No. 62/067,890, filed on Oct. 23, 2014.

(51) Int. Cl.
*B29C 48/00*   (2019.01)
*B29C 48/30*   (2019.01)
(Continued)

(52) U.S. Cl.
CPC ........ *B29C 48/0012* (2019.02); *B29C 44/468* (2013.01); *B29C 44/505* (2016.11);
(Continued)

(58) Field of Classification Search
CPC ............ B29C 48/0012; B29C 48/2566; B29C 44/505; B29C 48/705; B29C 48/305
See application file for complete search history.

(56) References Cited

U.S. PATENT DOCUMENTS 3,121,130 A   2/1964   Wiley
3,573,152 A   3/1971   Wiley
(Continued)

FOREIGN PATENT DOCUMENTS

CN   101868335 A   10/2010
CN   103842164 A   6/2014
(Continued)

OTHER PUBLICATIONS

Gibson, Cellular Solids: Structure and Properties, 345-386, (1997).
(Continued)

*Primary Examiner* — Alex A Rolland
(74) *Attorney, Agent, or Firm* — Kenneth B. Wood (57) ABSTRACT

A shim stack foaming die for making foam slabs comprises a plurality of shims that are layered together under pressure to form a shim stack, wherein the shims combine to collectively define a plurality of die orifices in a working face, to define a main body of the shim stack foaming die, and also to define a plurality of die cavity that is fluidly connected to the plurality of die orifices. And articles foamed from the shim stack foaming die have found wide use in various applications, thermal or acoustic insulation, reinforcing layers and/or space-filling layers, and so on.

18 Claims, 5 Drawing Sheets

(51) Int. Cl.
*B29C 48/305* (2019.01)
*B29C 48/25* (2019.01)
*B29C 44/46* (2006.01)
*B29C 44/50* (2006.01)
*B29C 48/70* (2019.01)
*B29K 105/04* (2006.01)

(52) U.S. Cl.
CPC .......... *B29C 48/2566* (2019.02); *B29C 48/30* (2019.02); *B29C 48/305* (2019.02); *B29C 48/705* (2019.02); *B29C 2948/92685* (2019.02); *B29C 2948/92942* (2019.02); *B29K 2105/04* (2013.01)

(56) References Cited

U.S. PATENT DOCUMENTS

| | | | |
|---|---|---|---|
| 3,881,984 A | 5/1975 | Soda | |
| 4,801,484 A | 1/1989 | Yao | |
| 5,429,840 A | 7/1995 | Raterman | |
| 5,679,379 A * | 10/1997 | Fabbricante | B29C 33/302 425/7 |
| 5,773,080 A | 6/1998 | Simmons | |
| 5,958,164 A | 9/1999 | Ishiwatari | |
| 6,106,922 A | 8/2000 | Cejka | |
| 6,289,956 B1 | 9/2001 | Shriver | |
| 6,440,241 B1 | 8/2002 | Mason | |
| 7,951,449 B2 | 5/2011 | Ma | |
| 2002/0026977 A1 | 3/2002 | Mason | |
| 2005/0031854 A1 | 2/2005 | Lorenz | |
| 2010/0295201 A1 | 11/2010 | Mihori et al. | |
| 2012/0248645 A1 | 10/2012 | Lavoie | |
| 2012/0263906 A1 | 10/2012 | Ausen | |
| 2012/0308755 A1 | 12/2012 | Gorman | |
| 2013/0011600 A1 | 1/2013 | Ausen | |
| 2013/0266766 A1 | 10/2013 | Vo | |
| 2014/0093703 A1 | 4/2014 | Hanschen | |
| 2014/0093716 A1 | 4/2014 | Hanschen | |
| 2014/0234606 A1 | 8/2014 | Ausen | |
| 2015/0047774 A1 | 2/2015 | Getschel | |

FOREIGN PATENT DOCUMENTS

| | | | |
|---|---|---|---|
| EP | 2 221 160 A1 | 8/2010 | |
| EP | 2221160 A1 * | 8/2010 | ............. B29C 39/18 |
| GB | 728981 | 4/1955 | |
| JP | 2006-102959 | 4/2006 | |
| KR | 10-2004-0069179 | 8/2004 | |
| KR | 10-1069132 | 9/2011 | |
| WO | WO 2001-039954 | 6/2001 | |
| WO | WO 2008-033973 | 3/2008 | |
| WO | WO 2010-078065 | 7/2010 | |
| WO | WO 2011-008396 | 1/2011 | |
| WO | 2013/028654 | 2/2013 | |
| WO | WO 2013-085773 | 6/2013 | |
| WO | WO 2013-086021 | 6/2013 | |
| WO | WO 2016-064600 | 4/2016 | |
| WO | WO 2016-064829 | 4/2016 | |

OTHER PUBLICATIONS

International Search Report for PCT International Application No. PCT/US2015/056397, dated Dec. 22, 2015, 3 pages.
International Search Report for PCT International Application No. PCT/US2015/056385, dated Jan. 28, 2016, 4 pages.
International Search Report for PCT International Application No. PCT/US2015/054909, dated Jan. 25, 2016, 4 pages.
Extended European Search Report, EP15852305.0, dated Jun. 12, 2018, 4 pages.

* cited by examiner

SHIM-STACK FOAMING DIE

BACKGROUND

Foamed articles have found wide use in various applications, thermal or acoustic insulation, reinforcing layers and/or space-filling layers, and so on.

SUMMARY

In broad summary, herein are disclosed shim-stack foaming dies for making foam slabs. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). For angular orientations, the term "generally" means within clockwise or counterclockwise 30 degrees. The term "substantially", unless otherwise specifically defined, means to a high degree of approximation (e.g., within +/−10% for quantifiable properties). For angular orientations, the term "substantially" means within clockwise or counterclockwise 10 degrees. The term "essentially" means within plus or minus 2% (plus or minus 2 degrees for angular orientations), and it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. Those of ordinary skill will appreciate that as used herein, terms such as "essentially free of", and the like, do not preclude the presence of some extremely low, e.g. 0.1% or less, amount of material, as may occur e.g. when using large scale production equipment subject to customary cleaning procedures. All references herein to numerical parameters (dimensions, ratios, and so on) are understood to be calculable (unless otherwise noted) by the use of average values derived from a number of measurements of the parameter, particularly for the case of a parameter that is variable (e.g., for an orifice whose width varies along the long axis of the orifice, the width of the orifice may be measured at several locations along the long axis of the orifice and an average value used for purposes of calculating an aspect ratio).

DETAILED DESCRIPTION

Glossary

By a foaming die is meant an extrusion die that is configured to withstand the pressures present in the extrusion of a molten foamable flowstream. By definition a foaming die comprises at least one die cavity configured to receive a molten flowstream e.g. from an extruder, and comprises a plurality of die orifices in fluid communication with the at least one die cavity.

By a molten foamable flowstream is meant a molten flowstream that comprises a molten foamable composition. In some cases such a flowstream may be a multilayer flowstream in which e.g. only one layer of the flowstream comprises a foamable composition.

By a molten foamable composition is meant a molten thermoplastic organic polymeric material that comprises a blowing agent (e.g., a physical blowing agent such as a gas or liquid; or, a chemical blowing agent that may chemically decompose e.g. at an elevated temperature, as discussed in detail later herein).

By non-foamable is meant a molten composition that is at least essentially free of activatable blowing agent (e.g., so that a solidified product of the molten composition is a non-foam material with a relative density that is at least essentially equal to 1.0.)

By a foam is meant an organic polymeric foam obtained by solidifying a molten foamable composition after the foaming process has proceeded to a desired extent.

By a foam slab is meant a foam entity with a length and a long axis, a lateral width and a lateral axis, and a thickness and a thickness axis, the three axes being orthogonal to each other and with the slab width being greater than the slab thickness. By definition, a foam slab is at least essentially compositionally uniform along the long axis of the slab. A foam slab admits the presence of densified (e.g. non-foam) material as a portion of the slab, as long as the densified material is made in the same operation as the foam portion of the slab, so that the portions collectively make up a unitary slab.

By unitary is meant an entity (e.g., a foam slab) that is made in a single operation by the coalescence and solidification of molten flowstreams and that cannot be separated into parts without unacceptably damaging or destroying the entity. A unitary entity may be a composite entity, as long as all portions (e.g. layers, members, etc.) of the entity were made and brought together with each other in a single (e.g. coalescing/solidifying) operation so that the portions cannot be separated from each other are not removable from each other.

By a composite foam slab is meant a unitary foam slab that comprises, in addition to a major foam phase, at least one minor foam phase comprising a densified material.

The term densified is used to distinguish a minor phase of a composite foam slab from a major, foam phase of the composite foam slab, and means that the minor phase exhibits a relative density that is at least about 15% higher than that of the major, foam phase. The term "densified" is used for convenience of description and does not signify that a "densified" material cannot be a foam, nor does it require that a densified material must be a material that was first made at a lower density and then processed to increase its density.

Relative density (e.g. of a foam material) is a dimensionless parameter obtained by dividing the overall density of a material (e.g., a foam comprising air-filled cells) by the density of the substance that makes up the cell walls of the material. Relative density is sometimes referred to as reduced density. For e.g. a polyester foam comprising a density of 0.5 g/cc and that comprises cell walls made of polyester that has a density of 1.35 g/cc, the relative density is about 0.37. For a conventional non-foam (and non-porous) material, the relative density will be at least essentially equal to 1.0.

Various terms relating to die orifice geometries and patterns (e.g., die height, die lateral axis, orifice height, and the meaning of such terms as laterally-adjacent, laterally-aligned, and laterally-coalesced), are defined and described in detail later herein, augmented by reference to various Figures. Terms such as height as used e.g. in the terms height axis and die height, the term vertical as used to denote a direction along the height axis, and terms such as upper/uppermost and lower/lowermost as used e.g. to denote locations along the height axis, are used purely for convenience of description with respect to the exemplary Figures presented herein, and do not require any specific orientation with regard to the Earth.

Shim-Stack Foaming Die

Figure 1:
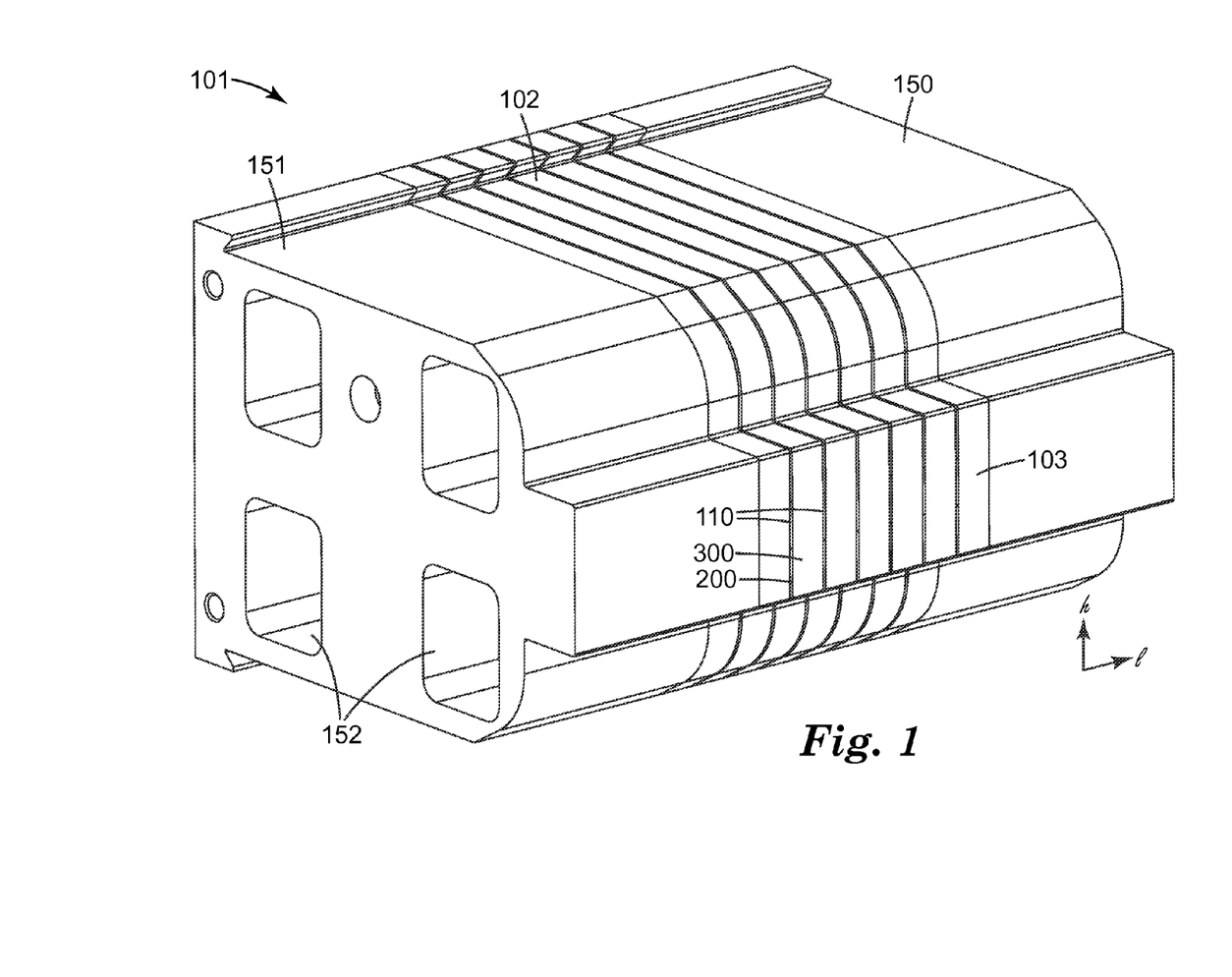
FIG. 1 is a front-side perspective view of an exemplary shim-stack foaming die.

With reference to FIG. 1, herein is disclosed a foaming die 101 that is provided by a plurality of shims that are layered (stacked) together under pressure to form the shim-stack foaming die 101. The shims combine to collectively define at least some die orifices 110 of the foaming die, to define a main body 102 of the foaming die, and also to define at least one die cavity (within the main body) that is fluidly connected to at least some of the die orifices 110.

Various parameters (e.g., width, height, spacing, and/or length) of the die orifices may be chosen as desired. It will be appreciated that these may be chosen in combination with e.g. the throughput of molten extrudate and other design and operating parameters, to provide that an appropriate pressure drop through the die orifices is achieved. That is, such parameters can be adjusted to provide that a molten foamable composition that is to be extruded to form a foam, is maintained at a sufficiently high pressure within the die that at least a substantial amount of blowing agent that is present in the molten foamable composition does not expand prematurely (e.g., prior to molten foamable flowstream 1010 exiting die 1 through a die orifice 110). (Some amount of expansion of blowing agent within the die orifice may be tolerated as long as the desired properties of the foam product are achieved.)

In this context it is noted that by definition a foaming die, in addition to being able to meet the usual requirements of extrusion (e.g. withstanding high temperatures, not exhibiting leakage of the molten polymeric flowstreams, and so on), must also withstand the process conditions that arise in a foaming process. Specifically, a foaming die must not exhibit leakage of an activated (e.g., gas or vapor) blowing agent (alternatively phrased, a foaming die must be able to maintain internal pressure sufficient to maintain the activated blowing agent in solution with the molten organic polymeric material) to a degree that unacceptably affects the ability to form a useful foam. A foaming die thus must possess an enhanced ability to prevent or minimize leakage of gases/vapors (in addition to liquid, molten flowstreams) therefrom. It is thus noted that a conventional extrusion die may not necessarily be able to be considered to be a foaming die, absent specific information that the die possesses such ability.

Figure 2:
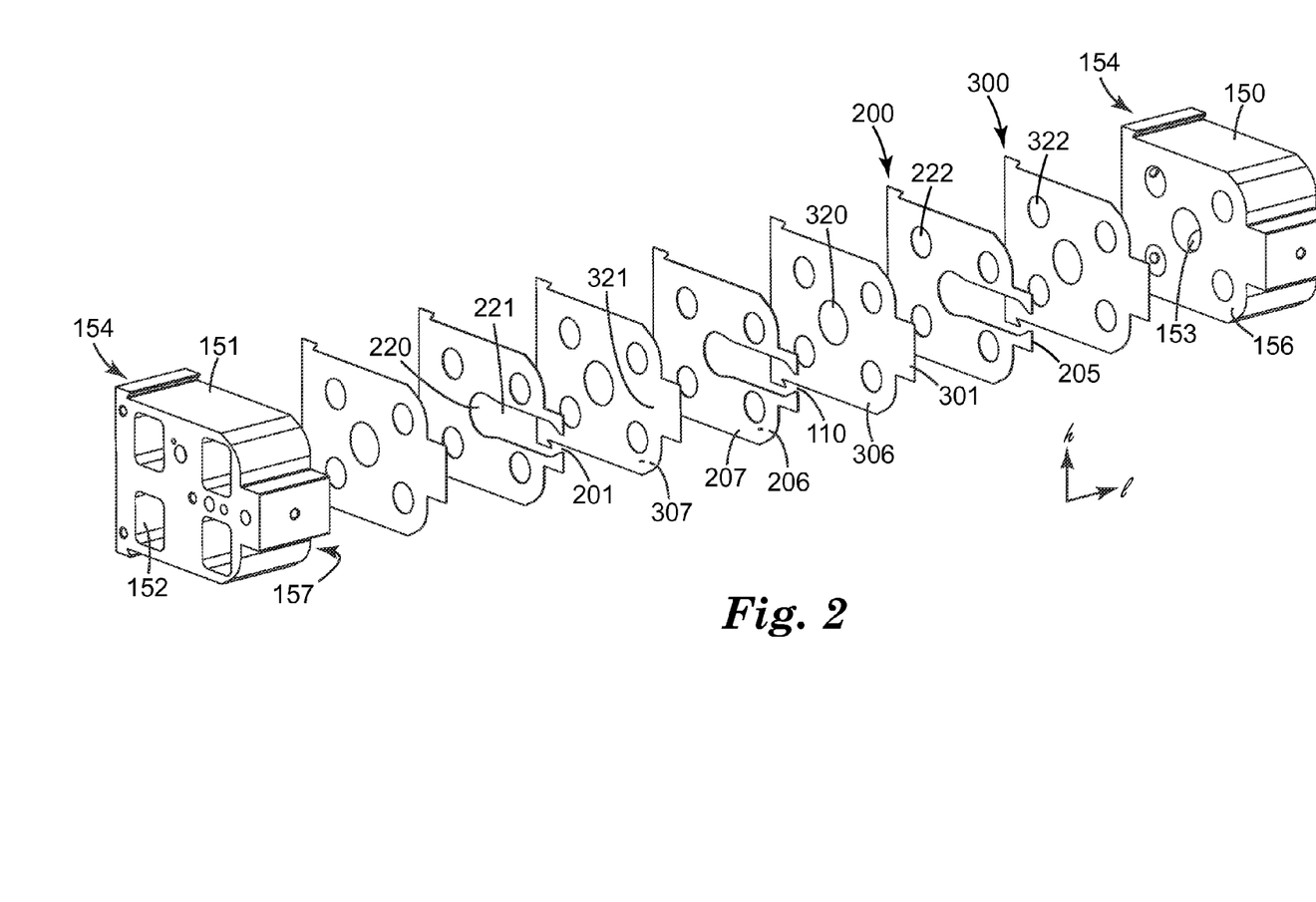
FIG. 2 is a front-side perspective exploded view of an exemplary shim-stack foaming die.

As noted, a shim-stack foaming die is produced by layering shims together under pressure. This may be achieved e.g. by positioning multiple orifice shims 200 and multiple spacer shims 300 (which will each be described in detail below) in a stack in a pre-determined sequence and clamping them between endblocks 150 and 151 (as shown in FIGS. 1 and 2) to form foaming die 101. For this purpose, one or more through-holes 152 may be provided in endblocks 150 and 151; and, one or more through-holes 222 and 322 may be respectively provided in shims 200 and 300, to permit the passage of one or more fasteners (e.g., bolts, not shown in any Figure) therethrough. By such arrangements endblocks 150 and 151 may be motivated laterally inwards (e.g., along the lateral axis of die 101) towards each other so as to clamp the plurality of shims securely between the laterally-inward surfaces 156 and 157 of endblocks 150 and 151 and to press the shims against each other. The exemplary designs of FIGS. 1 and 2 thus allow for the use of e.g. bolts that pass through the shim-stack and that pass at least partially through the endblocks. However, any suitable clamping arrangement may be used (either instead of the preceding arrangement or as an adjunct to it), including e.g. external clamps that are applied to the laterally outermost sides of the endblocks to apply laterally inward pressure thereto, which external clamps may not necessarily have any portion that passes through the endblocks or the shims.

One or both endblocks may have one or more input ports 154 (not visible in the particular designs of FIGS. 1 and 2) through which a molten foamable flowstream (e.g., from an extrusion apparatus) can be received. Such an input port 154 may be fluidly connected to at least one endblock output port 153 (located e.g. in a laterally inward face 156 of an endblock) through which the molten foamable flowstream may be distributed to at least one die cavity of the foaming die. The manner in which a molten foamable flowstream may be delivered to the at least one die cavity of the shim-stack foaming die is not particularly limited, however, and any suitable arrangement may be used.

By shim is meant a sheet-like layer that has a length (along the direction of flow of a molten foamable flowstream out of an orifice of the die) that is greater by a factor of at least four, and that has a height (along a height axis (h) of the foaming die) that is greater by a factor of at least two, than the thickness (along a lateral axis (l) of the foaming die) of the shim. Shims may be made of any suitable material that is sufficiently mechanically strong and tolerant of the temperatures involved in foam extrusion. In many embodiments, steel (e.g., stainless steel, spring steel, and so on) may be convenient, although other metals (e.g. bronze, brass, copper, nickel, tin, and so on), may be considered as long as their properties are satisfactory. If desired, materials such as ceramics, inorganic or organic polymeric materials, or the like, may be used, as long as their properties (e.g., the ability to withstand temperatures commensurate with extrusion) are suitable. Particularly suitable organic polymeric materials may include e.g. polydimethylsiloxane and related materials, polytetrafluoroethylene (PTFE) and related materials, polyimides, and so on. In some embodiments, relatively stiff and rigid shims (made e.g. of metal) may be used in combination with shims of lesser stiffness (made of e.g. PTFE).

A shim will exhibit first and second major surfaces (e.g., major surfaces 206 and 207 of orifice shims 200, and major surfaces 306 and 307 of spacer shims 300) that are at least essentially planar and that are at least essentially parallel to each other, to facilitate pressing the shims together in such a manner that will minimize or eliminate leakage of e.g. gases between surfaces of adjacent shims. Shims (e.g., orifice shims and spacer shims as described in detail below) may have any suitable thickness. In various embodiments, a shim may exhibit a thickness of at least about 0.05, 0.1, 0.2, 0.4, 1.0, 2, or 4 mm. In further embodiments, a shim may exhibit a thickness of at most about 10, 8, 6, 5, 4, 3, 2, 1.0, 0.5, 0.4, or 0.2 mm. In some instances it may be particularly convenient to use a spacer shim that is relatively thick (e.g., several mm). It will be appreciated that a shim of such thickness may have a relatively high bending stiffness; however, a shim of such thickness may still be satisfactorily used as long as the sufficient planarity and parallelism of the major surfaces of the shim are achieved.

Figure 3:
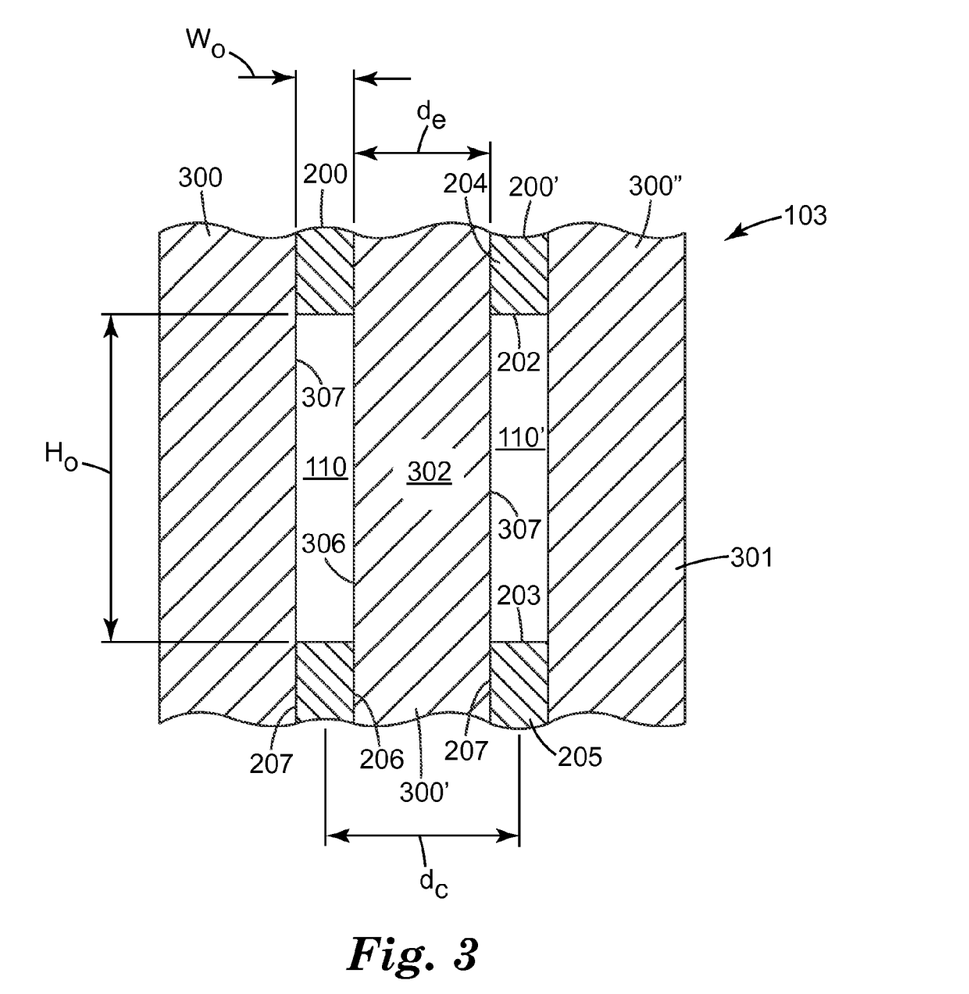
FIG. 3 is a front plan view of a portion of a front face of an exemplary shim-stack foaming die.
Figure 4:
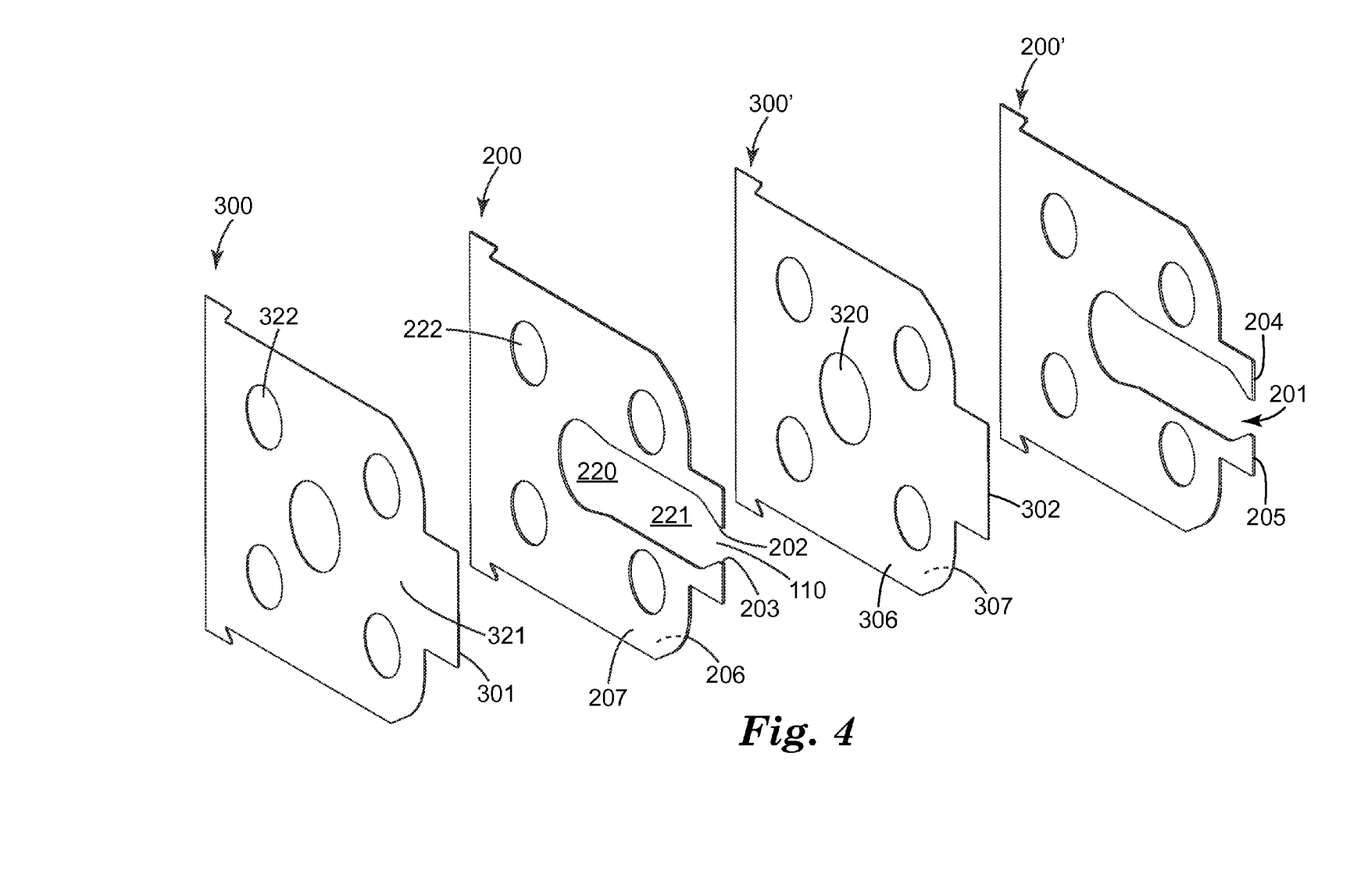
FIG. 4 is a front-side perspective exploded view of selected shims of an exemplary shim-stack foaming die.

As disclosed herein in exemplary embodiment in FIGS. 2 and 3, orifice shims 200 and spacer shims 300 are positioned (stacked) along the lateral axis of foaming die 101 so as to collectively define die orifices 110. As illustrated in detail in the magnified exploded view of FIG. 4, the term "orifice shim" is used to denote a shim 200 that comprises at least one open-ended cutout 221 that has an open end 201 that defines a height of a die orifice 110 when the shims are assembled together. Specifically, an orifice shim 200 comprises first and second orifice-height-defining edges 202 and 203 that define the upper and lower boundaries of open end 201 and thus of die orifice 110. The distance between edges 202 and 203 thus defines the orifice height ($H_o$) of a die orifice (as illustrated in FIG. 3) when the shims are stacked together. If desired, the open-ended cutout may be "necked" as shown in FIGS. 2 and 4, e.g. to provide a flow restriction proximate the die orifice so as to establish a desired pressure drop.

The term "spacer shim" is used for convenience to denote a shim 300 that is placed between a pair of nearest-neighbor orifice shims (or, between a pair of nearest-neighbor orifice shim bundles, as described later) so that die orifices (that are partially defined by the orifice shims) are laterally spaced apart at least by the thickness of spacer shim 300. A spacer shim will typically comprise at least one closed-ended cutout (e.g., cutout 320 of shim 300 as shown in FIGS. 2 and 4); however, in many embodiments (as in all of the Figures herein) a spacer shim may not comprise an open-ended cutout (e.g. of the type that defines a height of a die orifice as in an orifice shim).

Cutouts in shims, and the overall size and shape of shims, may be provided by any suitable method, e.g. electrodischarge machining, laser machining, water-jet-cutting, and so on. The term "cutout" is used for convenience to describe a through-opening that extends through a shim from one major surface to the other major surface; it is not necessary that the opening be formed by an actual cutting process. By open-ended is meant a cutout (e.g., 221) that extends to an edge (e.g., 204/205) of the shim that defines a portion of the working face of the shim-stack die. By closed-ended is meant a cutout (e.g., 320) that does not extend to an edge of the shim that defines a portion of the working face of the shim-stack die.

As shown in exemplary embodiment in FIG. 3, a spacer shim 300' may be positioned laterally between (that is, laterally sandwiched between) a first orifice shim 200 and a second, nearest-neighbor orifice shim 200'. (Shims 200 and 200' may be (and often are) identical, the (') designation being used here and elsewhere merely for ease of sequential description). In such a case, first major surface 306 of spacer shim 300' may be in contact with first major surface 206 of orifice shim 200. Similarly, second major surface 307 of spacer shim 300' may be in contact with second major surface 207 of second orifice shim 200'. The thickness of spacer shim 300' will thus define the edge-to-edge distance ($d_e$) between the two orifices 110 and 110', as shown in FIG. 3. The center-to-center distance ($d_c$) between the two orifices will be defined by the thickness of spacer shim 300' plus the combined half-thicknesses of the two orifice shims 200 and 200'.

It will be apparent that upon positioning orifice shims 200 and spacer shims 300 as shown in FIG. 3, the lateral edges of a die orifice 110 will be defined by first major surface 306 of spacer shim 300' and by second major surface 307 of spacer shim 300. Thus by arrangements of this general type, orifice shims 200 and spacer shims 300 may be arranged along the lateral axis of a foaming die (strictly speaking, the foaming die and lateral axis thereof will not exist until the shims are arranged to form the die) to form a plurality of die orifices 110 and to establish the dimensions of the individual orifices and the lateral spacing of the die orifices.

As most evident in FIGS. 1 and 2, front edges 301 of spacer shims 300, and upper and lower edge portions 204 and 205 of orifice shims 200, collectively define working face 103 of foaming die 101 (with portions 302 of front edges 301 of spacer shims 300 defining solid portions of working face 103 that lie between the various die orifices 110, as seen in FIG. 3). In the assembly of foaming die 101, the shims may be stacked together and all of these edges and edge portions may be abutted against a planar surface (e.g., a vibrating table) in order to align them as closely as possible with each other, prior to the shims being pressed together to form foaming die 101.

In many embodiments, each shim (e.g., each spacer shim and each orifice shim) may exhibit a major plane that is at least substantially aligned with the height axis (h) of the foaming die (in the exemplary embodiments of FIGS. 1 and 2, the major planes of the shims are at least essentially aligned with the height axis (h) of the foaming die). Such arrangements are termed a laterally-layered shim stack. In many embodiments, at least some of die orifices 110 may exhibit an elongated shape with a long axis that is oriented at least substantially orthogonal to the lateral axis (l) of the foaming die and that is at least substantially aligned with the height axis (h) of the foaming die. (In the exemplary embodiments of FIGS. 1 and 2, the long axes of the die orifices are at least essentially orthogonal to the lateral axis (l), and are at least essentially aligned with the height axis (h), of the forming die.)

The die orifices 110 may exhibit any desired orifice width ($W_o$) and any desired orifice height ($H_o$), (as depicted in exemplary embodiment in FIG. 3). In various embodiments a die orifice may exhibit an orifice width ($W_o$) of at least about 0.1, 0.2, 0.4, 0.5, 0.6, 0.8, 1.0, 1.5, or 2.0 mm. In further embodiments, a die orifice may exhibit an orifice width ($W_o$) of at most about 4, 3, 2, 1.5, 1.0, 0.8, 0.7, or 0.6 mm. In various embodiments, a die orifice may exhibit an orifice height ($H_o$) of at least about 4, 8, 12, 16 or 20 mm. In further embodiments, a die orifice may exhibit an orifice height ($H_o$) of at most about 200, 100, 80, 40, 30, 25, or 20 mm. In various embodiments, die orifices 110 may exhibit an orifice height ($H_o$) to orifice width ($W_o$) aspect ratio of at least about 1:1, 1.5:1, 2:1, 4:1, 8:1, 16:1, or 32:1. In further embodiments, die orifices 110 may exhibit an aspect ratio of at most about 100:1, 75:1, 50:1, 25:1, or 10:1. It will be appreciated that such an aspect ratio may be established e.g. by choosing the dimension of an opening 201 of an orifice shim 200, in relation to the thickness (between major surfaces 206 and 207) of that orifice shim. Similar effects may of course be achieved by the use of orifice shim bundles as described below.

Any number of die orifices 110 may be present. In at least some embodiments, the number of die orifices 110 and the lateral spacing thereof, may be sufficiently large that the die width (the distance between the laterally outermost edges of the laterally outermost die orifices) is greater than the die height (the distance between the vertically outermost edges of any die orifices). In various embodiments, the ratio of die width to die height may be at least about 1.5:1, 2:1, 4:1, 8:1, 16:1, 20:1, 30:1, or 40:1.

Orifice shims 200 and spacer shims 300 will combine to collectively provide at least one die cavity that is fluidly connected to at least some of the die orifices 110. It will be apparent from FIGS. 2 and 4 that cutouts 320 in spacer shims 300, and portions 220 of cutouts 221 in orifice shims 200, will, when the shims are assembled together, collectively provide a die cavity that is configured to receive a molten foamable flowstream from an extrusion apparatus (e.g. by way of the flowstream being delivered through one or both endblocks). It is emphasized that FIGS. 1 and 2, and particularly FIG. 4, only show a relatively small number of shims for ease of presentation; an actual shim-stack foaming die may contain many more shims than shown in these Figures. (Also for clarity of presentation, spacer shims 300 of FIGS. 2 and 4 are reduced in thickness compared to spacer shims 300 of FIG. 1; it is emphasized that all of these are exemplary depictions and none of the Figures herein are to scale.)

An actual die cavity may thus extend for much longer e.g. along the lateral axis (l) of foaming die 101 than is depicted in these Figures. Nevertheless, the exemplary embodiments of FIGS. 2 and 4 illustrate an arrangement in which a die cavity allows flow of a molten foamable composition at least generally along the lateral axis (l) of foaming die 101. It will be appreciated that each such cutout 320 of a spacer shim, and each portion 220 of a cutout 221 of an orifice shim, can thus provide a lateral "slice" of the die cavity that is formed by stacking the shims together. (In other words, the die cavity is collectively formed by the lateral slices (each provided by a cutout) when the shims are all assembled together.)

The die cavity comprises periodic channels (provided by the open-ended cutouts in the orifice shims 200) through which portions of the molten foamable composition can flow from the die cavity to different die orifices 110, with solid portions 321 of spacer shims 300 acting as physical separators between adjacent molten flowstreams as the flowstreams journey from the die cavity to individual die orifices 110.

The exemplary embodiment of FIG. 2 depicts an arrangement in which an orifice shim 200 is provided as a single orifice shim 200 between a pair of laterally nearest-neighbor spacer shims 300. In such arrangements, each such single orifice shim 200 will comprise a thickness that defines the width ($W_o$) of an orifice. Such an arrangement is depicted in FIG. 3. However, in other embodiments, multiple orifice shims 200 may be arranged (stacked) in contact with each other without any spacer shims therebetween (such an arrangement will be termed an orifice shim bundle). In such a case, the combined thickness of the orifice shims of the orifice shim bundle may define the width of an orifice (for example, three orifice shims that are each 50 microns in thickness, may be combined to provide an orifice with a width of 150 microns).

Similarly, the exemplary embodiment of FIG. 2 depicts an arrangement in which a spacer shim 300 is provided as a single spacer shim 300 between a pair of laterally nearest-neighbor orifice shims 200. In such arrangements, each single spacer shim 300 will comprise a thickness that defines a lateral edge-to-edge distance ($d_e$) between nearest lateral edges of a pair of nearest-neighbor die orifices 110. Such an arrangement is depicted in FIG. 3. However, in other embodiments, multiple spacer shims 300 may be arranged (stacked) in contact with each other (such an arrangement will be termed a spacer shim bundle). In such a case, the combined thickness of the spacer shims of the spacer shim bundle defines a lateral edge-to-edge distance ($d_e$) between nearest lateral edges of a pair of nearest-neighbor die orifices. Thus in some embodiments, rather than a single orifice shim of a particular thickness being used, a bundle of orifice shims of equivalent total thickness may be used. Similar considerations apply to using a bundle of spacer shims rather than a single spacer shim. Thus, any description herein of any orifice property (e.g. orifice height, width, aspect ratio, spacing, and so on) or foaming die property that was described in the context of single (unbundled) orifice shims and/or single (unbundled) spacer shims, is also applicable to orifices and foaming dies achieved by bundles of spacer shims and/or of orifice shims.

It will be appreciated that such shim-bundling arrangements can make it possible to readily assemble a shim-stack foaming die that comprises different orifice widths and/or orifice spacings. It also adds to the advantages of the stacked-shim approach in general, in making it possible to readily disassemble an existing foaming die and add or remove shims, or substitute shims of a different thickness, to investigate the efficacy of various die orifice configurations and arrangements. Any suitable number of shims may be used. (It will be appreciated however that in some particular embodiments, e.g. in the event of relatively constant, high-volume production, it may be convenient to use a relatively small number of shims (e.g. of relatively high thickness) rather than to combine large numbers of shims of low thickness.) In various embodiments, a shim-stack foaming die 101 may comprise at least about 5, 10, 20, 40, 100, 200, 500, 1000, 2000, or 4000 shims (counting both orifice shims and spacer shims). In further embodiments, a shim-stack foaming die 101 may comprise at most about 100,000, 50,000, 10,000, 6000, 3000, 2000, 1000, 600, 400, 200, 100, 80, or 60 total shims.

It will be appreciated that a shim-stack foaming die must meet the previously-described requirement of a foaming die; that is, it must not exhibit leakage of an activated (e.g., gas or vapor) blowing agent to an extent that unacceptably affects the ability to form a useful foam. As evidenced in the Working Examples herein, it has been unexpectedly found that a shim-stack die comprising e.g. around 500 total shims, can satisfactorily meet the requirements of a foaming die. That is, given the presence of numerous potential slit leaks between the numerous pairs of nearest-neighbor shims, it was unexpectedly found that the shims can be pressed together (e.g. as described earlier herein) so as to substantially or essentially completely eliminate any leakage of gases (e.g., of activated blowing agent) therefrom, even when the foaming die is operated at pressures commensurate with foaming operations (e.g., at pressures in the range of 5000 psi, 10000 psi, or more).

It will also be appreciated that the exemplary embodiments of FIGS. 1-4 are representative of a simple arrangement in which the height and width of each orifice are defined by a single orifice shim (or, alternatively, by a bundle of identical orifice shims), in which all of the orifices are of the same height and width and are co-linear with identical spacings along the lateral axis of the foaming die (with the spacing between orifices being determined by the width of a single spacer die or by a bundle of spacer shims). Furthermore, all of the orifices are in a single row.

It is emphasized that these are merely exemplary arrangements that are included for convenience of presentation; any desired orifice pattern can be used as long as it can be achieved by stacking shims together. That is, all such orifices do not need to have identical heights or widths; they do not need to be exactly co-linear, nor do they need to be at exactly the same spacing. Furthermore, they do not need to be in a single row. Thus for example, orifices may be present in a staggered row, or as multiple rows.

In some embodiments, shim-stack foaming die 101 may be configured so that die orifices 110 are in a laterally-aligned pattern, e.g. so as to make a laterally-coalesced foam slab. Laterally-aligned die orifice patterns and their use are described in detail in copending U.S. Provisional Patent Application Ser. No. 62/067,888 filed evendate with the present application, entitled Foaming Die and Method of Use, which is incorporated by reference herein in its entirety.

In addition, the exemplary embodiments of FIGS. 1-4 are representative of arrangements in which a simple sequence of shims is used. For example, FIG. 2 depicts an arrangement with a shim sequence of S-O-S-O-S-O-S (here and elsewhere, S indicates a single spacer shim or a single bundle of spacer shims; O indicates a single orifice shim or a single bundle of orifice shims), in which all of the spacer shims are identical to each other and all of the orifice shims are identical to each other. This arrangement thus produces the above-mentioned single row of co-linear, identically sized and shaped, and identically spaced die orifices. It is emphasized that this is not strictly necessary and that many variations are possible. For example, different orifice shims may have orifice-height-defining open ends 201 of different dimensions and/or may have open ends that are at different positions from each other (so as to make e.g. a staggered row of orifices or even two or more rows of orifices). Different spacer shims may have different thicknesses so as to vary the spacing between orifices.

In particular embodiments, bundles of orifice shims may be used to produce orifices that have shapes other than e.g. the simple orthogonal-edged shapes (rectangles) shown in FIG. 3. Thus in some embodiments a number of (e.g. non-identical) orifice shims may be bundled together to form a die orifice that is bounded by a "stepped" edge. Such a stepped-edge die orifice may comprise any attainable shape such as e.g. a cross, a T shape, a double-ended-T shape (e.g. a quasi-dogbone shape), and so on. It will be appreciated that as the number of orifice shims is increased and the thickness of the orifice shims is decreased, a die orifice can be produced that, although still being e.g. a rectilinear polygon with edges that are "stepped" when inspected in fine detail, may e.g. approach an overall non-rectilinear-polygonal shape. That is, such an orifice may exhibit "ziggurat" (fractal)-style edges that define an orifice boundary that may be e.g. at least quasi-circular, quasi-oval, or quasi-hourglass in overall shape. (Somewhat similar effects may also be possible e.g. by providing (e.g., by electrodischarge machining or the like) non-orthogonal edges or walls in shims.) Many die orifices that are not necessarily strictly rectangular in shape, may still exhibit an elongated shape with an identifiable long axis that may be e.g. at least substantially orthogonal to the lateral axis (l) of foaming die 101. Such die orifices may also still have a calculable aspect ratio, with the average dimensions being used in such calculation.

The exemplary embodiments of FIGS. 1-4, and discussions thereof, have all involved shim-stack foaming dies that comprise a single die cavity. (It is emphasized that the particular arrangements, e.g. the number of shims (13 total shims in FIG. 1, 7 total shims in FIG. 2, 4 total shims in FIG. 4), has been chosen for ease of presentation and may not necessarily be representative of any arrangement used in the Working Examples.) In other embodiments, multiple (e.g., two, three, four, or more) die cavities may be present. Specifically, shims may combine to collectively define a first set of die orifices and to collectively define a first die cavity that is configured to receive a first molten foamable composition and that is fluidly connected to the first set of die orifices. The shims may also combine to collectively define a second set of die orifices and to collectively define a second die cavity that is configured to receive a second molten composition and that is fluidly connected to the second set of foaming die orifices (and so on, for e.g. third or fourth die cavities and sets of die orifices). In such a case, the e.g. first and second die cavities (and others if present) may be configured to receive the same molten composition (e.g., as supplied by a single extruder or by two extruders in tandem). In other cases, the first die cavity may be configured to receive a molten flowstream from a first extruder and the second die cavity may be configured to receive a molten flowstream from a second extruder that is different from the first extruder, and so on. In such cases, different molten compositions may be emitted from the different die orifice sets, so as to make e.g. a composite foam slab. In particular embodiments, die orifices of the second orifice set may be interspersed in between die orifices of the first orifice set, e.g. to make a composite foam slab that comprises e.g. elongate members (resulting from solidification of the molten composition emitted from the orifices of the second orifice set) that are spaced across the lateral width of a foam slab that is the result of solidification of the molten composition emitted from the orifices of the first orifice set.

Details of exemplary foam slabs, e.g. laterally-coalesced unitary foam slabs and laterally-coalesced unitary composite foam slabs, that may be made e.g. by processes and apparatus of the general type described above, are discussed in detail in copending U.S. Provisional Patent Application Ser. No. 62/067,896 filed evendate with the present application, entitled Laterally-Coalesced Foam Slab, which is incorporated by reference herein in its entirety.

Figure 5:
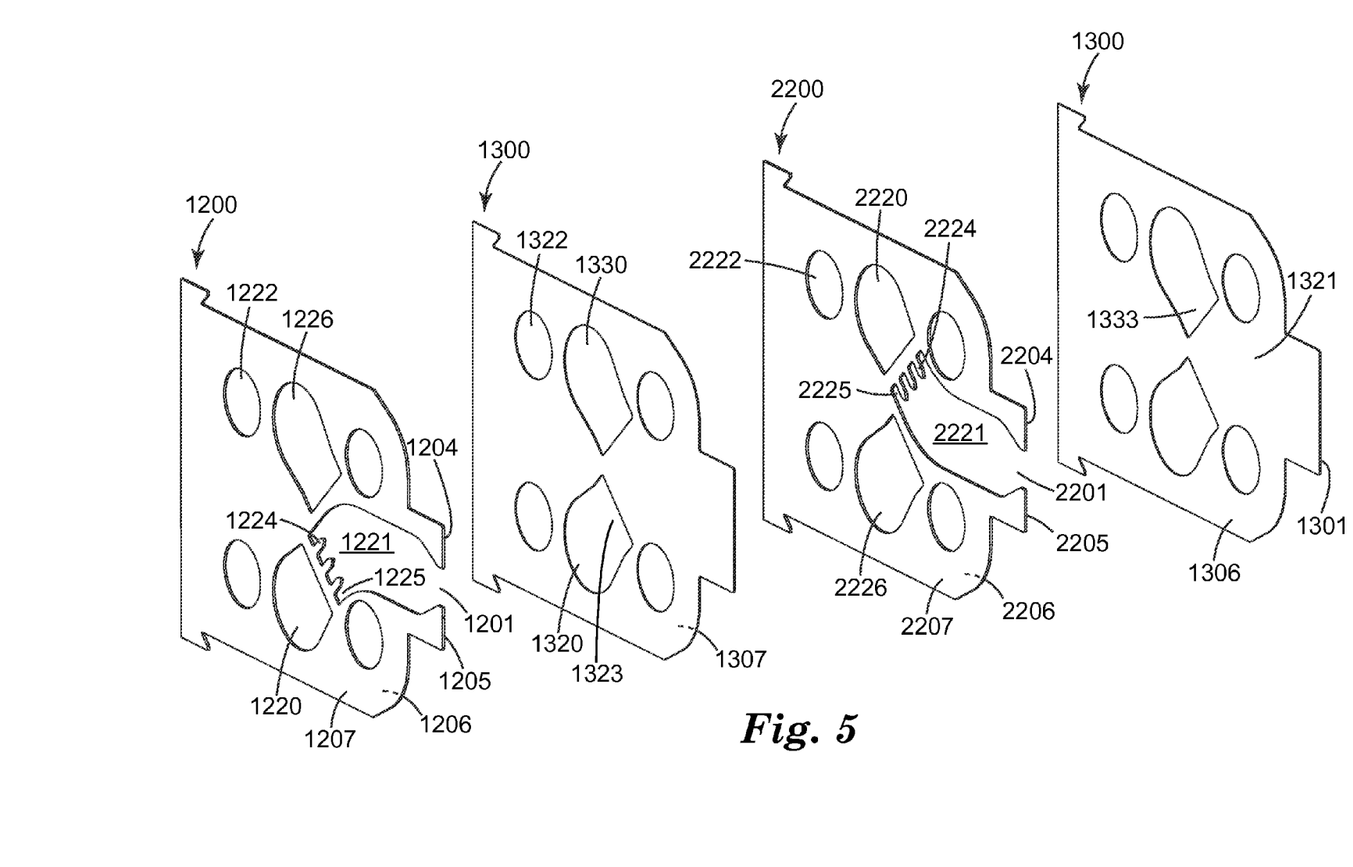
FIG. 5 is a front-side perspective exploded view of selected shims of another exemplary shim-stack foaming die.

Multiple-die-cavity designs may be explored in further detail with respect to the exemplary embodiment of FIG. 5, which depicts a magnified exploded view of selected shims of a two-die-cavity shim-stack foaming die. (Many more shims may of course be present in an actual foaming die; FIG. 5 merely presents one exemplary repeat unit of first and second orifice shims 1200 and 2200 and two spacer shims 1300; i.e., an $O_1$-S-$O_2$-S repeat unit.)

Exemplary spacer shims 1300 of FIG. 5 are generally similar to the earlier-described spacer shims 300 (e.g. with cutouts 1322 for e.g. fasteners to pass through, with first and second major surfaces 1306/1307, with front edges 1301, and with barrier portions 1321 that separate adjacent flowstreams). However, spacer shims 1300 differ from previously-described spacer shims in that each spacer shim 1300 comprises a first (lower) cutout 1320 that defines a lateral slice of a first (lower) die cavity), and a second (upper) cutout 1330 that defines a lateral slice of a second (upper) die cavity. Exemplary orifice shims 1200 and 2200 similarly have fastener-accepting cutouts 1222 and 2222, major surfaces 1206/1207 and 2206/2207, front edges 1204/1205 and 2204/2205, and open ends 1201/2201, all of which function substantially as described for the corresponding features of the single-cavity arrangement discussed with respect to FIG. 4. However, first orifice shim 1200 has first and second closed-end cutouts 1220 and 1226. Cutout 1226 merely serves to provide a lateral slice of an upper die cavity, as will become apparent in discussions below. Cutout 1220 provides a lateral slice of a lower die cavity, but also serves in combination with lower cutout 1320 of spacer shim 1300, and with open-ended cutout 1221 of orifice shim 1200, to deliver a molten flowstream from the lower die cavity to a die orifice (corresponding to open end 1201 of shim 1200). This is enabled by the lateral overlap of openings 1225 (between the teeth of "comb" structure 1224 of orifice shim 1200) with portion 1323 of cutout 1320 of spacer shim 1300. This arrangement allows a molten material to flow from the die cavity (collectively provided by cutouts 1220, 1320, 2226, and other cutouts that are laterally-aligned therewith, of other shims of the shim-stack) into open-ended cutout 1221 and from there to opening (die orifice) 1201.

Similar considerations hold for second orifice shim 2200, which has first and second closed-end cutouts 2226 and 2220. Cutout 2226 merely serves to provide a lateral slice of a lower die cavity. Cutout 2220 provides a lateral slice of an upper die cavity, but also serves in combination with upper cutout 1330 of spacer shim 1300, and with open-ended cutout 2221 of orifice shim 2200, to deliver a molten flowstream from the upper die cavity to a die orifice (corresponding to open end 2201 of shim 2200). This is enabled by the lateral overlap of openings 2225 (between the teeth of "comb" structure 2224 of orifice shim 2200) with portion 1333 of cutout 1330 of spacer shim 1300. This arrangement allows a molten material to flow from the die cavity (collectively provided by cutouts 1226, 1330, 2220, and other cutouts that are laterally-aligned therewith, of other shims of the shim-stack) into open-ended cutout 2221 and from there to opening (die orifice) 2201.

It is thus apparent that such arrangement allow successive (i.e., laterally-neighboring) die orifices (provided e.g. by open ends 1201 and 2201) to be respectively fed molten flowstreams from a lower die cavity and from an upper die cavity. As noted, if desired the different die cavities may receive molten flowstreams from different extruders thus may be used e.g. to make a composite foam slab. It is noted in passing that an arrangement as described herein (e.g. with "teeth" 1224 and 2224) may provide the requisite pathway for a molten flowstream to flow from a die cavity to an open-ended cutout (i.e., to a die orifice) while providing support to minimize any flexing or deformation of the shims when they are pressed together to the extent commensurate with extruding a foamable composition. It is emphasized however that FIG. 5 represents an exemplary embodiment and that other arrangements may likewise provide a shim-stack foaming die comprising multiple die cavities.

Many variations are possible based on the general disclosures and arrangements presented above. In some particular embodiments, a first set of shims may each comprise an open-ended cutout e.g. on an upper portion of the shim, so that these shims define (upper and lower edges of) a first (upper) set of orifices. A second set of shims may each comprise an open-ended cutout e.g. on a lower portion of the shim, so that these shims define a second (lower) set of orifices. The first set of shims may each also comprise a closed-ended cutout that provides a lateral slice of a second die cavity that is in fluid communication with the second set of orifices. Similarly, the second set of shims may each comprise a closed-ended cutout that provides a lateral slice of a first die cavity that is in fluid communication with the first set of orifices. If the shims of the first set are e.g. alternated with the shims of the second set, each shim may serve as an orifice shim and also as a spacer shim (e.g., a shim of the first set can be an orifice-defining shim for at least one orifice of the first (upper) set of orifices, and may also define the lateral edge-to-edge spacing between two orifices of the second (lower) set of orifices).

The above is one example of a general arrangement in which at least one shim of a shim-stack may serve as both an orifice shim and as a spacer shim. Such arrangements represent an acceptable exception to the above-mentioned condition that a spacer shim often may not play any part in defining a die orifice. Such arrangements may be particularly helpful if it is desired to e.g. provide die orifices in multiple rows and so on (regardless of whether all of the die orifices are fed by a common die cavity or whether different sets of die orifices are fed from different die cavities).

Foaming die 101 may include any other ancillary equipment as desired for a particular circumstance. For example, a support structure may assist in bearing the weight of the assembled shim die. If desired, one or more external heaters, e.g. edge heaters, might be positioned in thermal contact with the shim-stack (e.g., such heaters might be abutted against the top and bottom of a shim-stack of the type shown in FIG. 1). If desired, one or more internal heaters (e.g., in the form of rods) may be e.g. inserted into openings that extend at least into the endblocks, and/or that extend through the entire lateral length of the shim-stack. For example, one or more of through-holes 222 and 322 might accept an internal heater rather than a fastener. (The particular arrangement of through-holes 222 and 322 in FIGS. 2 and 4 is exemplary and any desired number of through-openings, arranged in any desired pattern, may be used for any purpose.) If desired, a protective stencil or mask (e.g. a thin metal plate with openings therein that coincide with die orifices 110) may be abutted against the working face 103 of the foaming die. Furthermore, one or more handles, hooks, and so on, may be provided to enhance the ease of supporting, moving or transporting foaming die 101.

Foaming die 101 may be used with any suitable extrusion apparatus (e.g. comprising one or more extruders, whether operated e.g. in tandem or in parallel), with any suitable thermoplastic (melt-processable) organic polymers (including, but not limited to, polyesters, polyolefins, and so on), and with any suitable blowing agents (e.g., chemical or physical). Furthermore, foaming die 101 may be used to emit molten foamable extrudate flowstreams into an undefined space; or, into e.g. a dual-belt laminator by way which a substrate can be laminated to at least one major surface of the thus-formed foam slab. Such apparatus, materials, and arrangements are discussed in detail in copending U.S. Provisional Patent Application Ser. No. 62/067,888 filed evendate with the present application, entitled Foaming Die and Method of Use.

The apparatus and methods disclosed herein (e.g., those involving multiple die cavity designs) may be also used to make composite foam slabs that comprise a major, foam phase and a minor, densified phase, again as described in detail in the above-recited U.S. Provisional Patent Application.

LIST OF EXEMPLARY EMBODIMENTS

Embodiment 1 is a foaming die for extruding a molten foamable composition, comprising: a plurality of shims that are layered together under pressure to form a shim stack, the shims combining to collectively define a plurality of die orifices in a working face of the foaming die and to collectively define at least one die cavity that is configured to receive a molten foamable composition from an extrusion apparatus and that is fluidly connected to the die orifices. Embodiment 2 is the foaming die of embodiment 1 wherein the shim stack is comprised of at least about twenty shims Embodiment 3 is the foaming die of embodiment 1 wherein the shim stack is comprised of at least about two hundred shims Embodiment 4 is the foaming die of any of embodiments 1-3 wherein the die orifices of the plurality of die orifices are spaced in a single row along a lateral axis of the foaming die. Embodiment 5 is the foaming die of any of embodiments 1-4 wherein the die orifices each exhibit an elongated shape with a long axis that is oriented at least substantially orthogonal to a lateral axis of the foaming die and that is at least substantially aligned with a height axis of the foaming die, and wherein the die orifices each exhibit an orifice height to orifice width aspect ratio of at least about 4:1. Embodiment 6 is the foaming die of any of embodiments 1-5 wherein each shim of the plurality of shims exhibits a major plane that is at least substantially parallel to a thickness axis of the foaming die.

Embodiment 7 is the foaming die of any of embodiments 1-6 wherein the plurality of shims includes a first shim set of orifice shims, each orifice shim comprising at least one open-ended cutout that defines a height of a die orifice and that defines a lateral slice of the at least one die cavity; and, wherein the plurality of shims includes a second shim set of spacer shims, each of which spacer shims does not comprise an open-ended cutout that defines a height of a die orifice but does comprise at least one closed-ended cutout that defines a lateral slice of the at least one die cavity. Embodiment 8 is the foaming die of embodiment 7 wherein at least selected orifice shims are each present as a single orifice shim between a pair of nearest-neighbor spacer shims, and wherein each selected orifice shim comprises a thickness that defines an orifice width of at least one die orifice. Embodiment 9 is the foaming die of embodiment 7 wherein at least selected orifice shims are each present as a bundle of multiple orifice shims without a spacer shim being present between any of the orifice shims of the bundle of multiple orifice shims, and wherein a combined thickness of the orifice shims of the bundle of orifice shims defines an orifice width of at least one die orifice.

Embodiment 10 is the foaming die of any of embodiments 7-9 wherein at least selected spacer shims are each present as a single spacer shim between a pair of nearest-neighbor orifice shims, and wherein each selected spacer shim comprises a thickness that defines a lateral edge-to-edge distance between nearest lateral edges of a pair of nearest-neighbor die orifices. Embodiment 11 is the foaming die of any of embodiments 7-9 wherein at least selected spacer shims are each present as a bundle of multiple spacer shims without an orifice shim being present between any of the spacer shims of the bundle of multiple spacer shims, and wherein a combined thickness of the spacer shims of the bundle of spacer shims defines a lateral edge-to-edge distance between nearest lateral edges of a pair of nearest-neighbor die orifices.

Embodiment 12 is the foaming die of any of embodiments 1-11 wherein the shims combine to collectively define a first set of die orifices in the working face of the foaming die and to collectively define a first die cavity that is configured to receive a first molten foamable composition from an extruder that is fluidly connected to the first set of die orifices; and, wherein the shims combine to collectively define a second set of die orifices in the working face of the foaming die and to collectively define a second die cavity that is configured to receive a second molten composition from an extruder that is fluidly connected to the second set of foaming die orifices. Embodiment 13 is the foaming die of embodiment 12 wherein the second die cavity is configured to receive a second molten composition from a second extruder that is a different extruder than the extruder from which the first die cavity is configured to receive a first molten foamable composition; and, wherein the second molten composition is a densified molten composition. Embodiment 14 is the foaming die of embodiment 12 wherein at least selected die orifices of the second set of die orifices are each laterally sandwiched in between a pair of die orifices of the first set of die orifices.

Embodiment 15 is the foaming die of any of embodiments 1-14 wherein the die orifices are laterally-aligned die orifices. Embodiment 16 is the foaming die of any of embodiments 1-15 wherein the foaming die is fluidly coupled to an extrusion apparatus that comprises at least one extruder and that is configured to continuously supply a molten foamable flowstream to at least one die cavity of the foaming die. Embodiment 17 is the foaming die of any of embodiments 1-16 wherein the plurality of shims includes a first shim set of orifice shims, each orifice shim comprising at least one open-ended cutout that defines a height of a die orifice and that defines a lateral slice of the at least one die cavity; and, wherein the at least one open-ended cutout comprises, at a terminal end of the open-ended cutout that is substantially opposite the open end of the open-ended cutout, a comb structure comprising a linear array of teeth with spaces interspersed therebetween.

Embodiment 18 is a method of making a unitary foam slab, the method comprising: continuously emitting molten foamable extrudate flowstreams through at least selected die orifices of the plurality of die orifices of the foaming die of any of embodiments 1-17, and, allowing the molten foamable extrudate flowstreams to foam, to coalesce and to solidify as a unitary mass so as to form a unitary foam slab with a slab width and a slab thickness.

EXAMPLES

Representative Working Example

A shim-stack foaming die was assembled of the general type depicted in FIGS. 1 and 2, except using two-cavity shims of the general type shown in FIG. 5. The foaming die had fifty laterally-aligned, elongated orifices that were spaced across the lateral width of the thus-formed foaming die in a single row, in generally similar manner as depicted in FIG. 1, each with an orifice width ($W_o$) of 16 mils and with an orifice height ($H_o$) of 625 mils. Rather than using single orifice shims (of thickness 16 mils) to provide this orifice width, orifice shim bundles were used, each bundle comprised of four orifice shims of 4 mils thickness. Spacer shims were used to space the orifices at an edge-to-edge distance ($d_e$) of approximately 60 mils (thus providing a center-to-center orifice distance ($d_c$) of 76 mils). Rather than single spacer shims being used, spacer shim bundles were used, each bundle being comprised of three shims of 20 mil thickness.

The shim-stack foaming die thus had a total of 347 shims (200 total orifice shims in 50 bundles of 4 shims each, and 147 total spacer shims in 49 bundles of 3 shims each), defining 50 die orifices in all; a first set of 25 orifices in fluid communication with a first die cavity and a second set of 25 orifices in fluid communication with a second die cavity. In this Representative Working Example a molten foamable flowstream was only fed to the first die cavity (and from there to the first set of 25 "active" die orifices to which that die cavity was fluidly connected). It will thus be understood that each pair of nearest-neighbor active die orifices was interspersed by an inactive (unused) die orifice through which no molten extrudate was emitted. (Strictly speaking, in this mode of operation each pair of active die orifices was spaced apart not purely by spacer shims, but also by orifice shims that provided an inactive die orifice therebetween.)

Thus in summary, the foaming die defined 25 active die orifices, that were arranged at an edge-to-edge spacing of approximately 136 mils (and a center-to-center spacing of approximately 152 mils) to provide an active die width $W_d$ of approximately 3.74 inches. (The orifice height $H_o$ and die height $H_d$ were not affected by the fact that only one of the die cavities was used.)

All shims were made of stainless steel that had been EDM (electrodischarge machining) cut to the desired shape and to provide cutouts as desired. All shims were held together by four bolts passed through cutouts (of the general type designated 1222, 1322, and 2222 in FIG. 5) in the shim-stack. These bolts were tightened with as much torque as possible using an air powered torque wrench. Edge heaters were coupled to the top and bottom of the die. Thermocouples were used for temperature monitoring in customary fashion.

A foamable composition was prepared, comprising thermoplastic polyester (PET) resin (POLYCLEAR 1101; Auriga, Charlotte, N.C.) at 95 wt. %, a chemical blowing agent (Sukano TA17-10; Duncan, S.C.) at 2 wt. %, and a chain extender (Sukano $T_{me}$ S606) at 3 wt. %. The foamable composition was loaded into the hopper of a 1.25" single screw extruder and was extruded under the conditions listed in Table 1:

TABLE 1

| Parameter | Value |
|---|---|
| Screw RPM | 68.1 |
| Zone 1 (F.) | 432 |
| Zone 2 (F.) | 540 |
| Zone 3 (F.) | 547 |
| Adapt (F.) | 494 |
| Necktube (F.) | 510 |
| Die (F.) | 500 |
| Die edge heaters (F.) | 520 |
| Pressure (psi) | 2200 |

The die was oriented with its lateral axis approximately horizontal to the Earth surface. A takeaway belt was positioned a few centimeters below the working face of the die, oriented approximately horizontal to the Earth surface. The die was oriented so that the direction of flow of molten extrudate out of the die orifices was angled slightly downward (at an angle of approximately 15 degrees below horizontal) toward the upper surface of the takeaway belt so that the molten extrudate was collected on the takeaway belt. The takeaway belt speed was approximately 0.6 feet per minute.

Under these conditions, the coalescence distance ($D_c$) was estimated to be within a few (e.g. 1-3) mm of the working face of the die. The thus-formed laterally-coalesced unitary foam slab exhibited approximate (average) values of 0.35 g/cc density, 5.8 inch width, and 1.3 inch thickness.

Working Example 2

A shim-stack foaming die was used of the general type described in the Representative Working Example, except that the die with had fifty active orifices, each 24 mils in width and 625 mils in height. Rather than using single orifice shims, orifice shim bundles were used, each bundle comprising six orifice shims of 4 mils thickness. Spacer shims were used to space the orifices at an edge-to-edge distance ($d_e$) of approximately 80 mils (thus providing a center-to-center orifice distance ($d_c$) of 104 mils). Rather than single spacer shims being used, spacer shim bundles were used, each bundle being comprised of four shims of 20 mil thickness.

This die design had a total of 496 shims and was 5.1 inches wide. Two foamable compositions were prepared, each of the same composition as for the Representative Example. The foamable compositions were each loaded into a hopper of a 1.25" single screw extruder; two such extruders were used, one feeding a first die cavity and first die orifice set, the second feeding a second die cavity and second die orifice set. Thus, in this Example, all die orifices were active orifices and all were fed the same molten foamable composition (although from two different extruders.)

The two compositions were extruded under the conditions listed in Table 2 (the extruders were not identical in configuration so they were operated at somewhat different conditions):

TABLE 2

| Parameter | Extruder #1 | Extruder #2 |
|---|---|---|
| Screw RPM | 58.1 | 29 |
| Zone 1 (F.) | 436 | 460 |
| Zone 2 (F.) | 519 | 520 |
| Zone 3 (F.) | 539 | 540 |
| Adapt (F.) | 513 | 520 |
| Necktube (F.) | 490 | 476 |
| Pressure (psi) | 2600 | 4000 |
| Die (F.) | 480 | |
| Die edge heaters (F.) | 480 | |

The takeaway belt speed was approximately 0.6 feet per minute. Under these conditions, the coalescence distance ($D_c$) was estimated to be within a few (e.g. 1-3) mm of the working face of the die. The thus-formed laterally-coalesced unitary foam slab exhibited approximate (average) values of 0.36 g/cc density, 5.5 inch width, and 1.4 inch thickness.

Working Example 3

The shim-stack foaming die of Working Example 2 was used. Two identical foamable compositions were prepared, each comprising high melt strength polypropylene (Borealis WB140HMS; Vienna, Austria) at 98 wt. %, and a chemical blowing agent (Reedy FPE-50; Charlotte, N.C.) at 2 wt. %. The foamable compositions were each loaded into a hopper of one of two 1.25" single screw extruders, each extruder feeding a different die cavity, in the same manner as in Working Example 2.

The two compositions were extruded under the conditions listed in Table 3:

TABLE 3

| Parameter | Extruder #1 | Extruder #2 |
|---|---|---|
| Screw RPM | 83.4 | 80.2 |
| Zone 1 (F.) | 350 | 350 |
| Zone 2 (F.) | 430 | 430 |
| Zone 3 (F.) | 433 | 400 |
| Adapt (F.) | 370 | 370 |
| Necktube (F.) | 370 | 360 |
| Die (F.) | | 340 |
| Die edge heaters (F.) | | 340 |
| Pressure (psi) | 2000 | 2400 |

The takeaway belt speed was approximately 0.6 feet per minute. Under these conditions, the coalescence distance ($D_c$) was estimated to be within a few (e.g. 1-3) mm of the working face of the die. The thus-formed laterally-coalesced unitary foam slab exhibited approximate (average) values of 0.54 g/cc density, 3.8 inch width, and 0.6 inch thickness.

Working Example 4

A shim-stack foaming die was assembled of the type described in the Representative Working Example, except that the die with had fifty active orifices, each 16 mils in width and 625 mils in height. Rather than using single orifice shims, orifice shim bundles were used, each bundle comprised four orifice shims of 4 mils thickness. Spacer shims were used to space the orifices at an edge-to-edge distance ($d_e$) of approximately 60 mils (thus providing a center-to-center orifice distance ($d_c$) of 76 mils). Rather than single spacer shims being used, spacer shim bundles were used, each bundle being comprised of three shims of 20 mil thickness.

This die design had a total of 347 shims and was 3.74 inches wide. A first, foamable composition was prepared, of the same composition as in the Representative Working Example. A second composition was prepared, that was PET-G (polyethylene terephthalate-glycol modified; EASTAR Copolyester 6763, Eastman Chemical, Kingsport, Tenn.). The second composition was not a foamable composition. The first and second compositions were respectively fed to first and second 1.25" extruders, and were processed under the conditions listed in Table 4:

TABLE 4

| Parameter | 1st Extruder/composition | 2nd Extruder/composition |
|---|---|---|
| Screw RPM | 102 | 15.2 |
| Zone 1 (F.) | 442 | 480 |
| Zone 2 (F.) | 540 | 500 |
| Zone 3 (F.) | 538 | 500 |
| Adapt (F.) | 484 | 500 |
| Necktube (F.) | 518 | 474 |
| Pressure (psi) | 3800 | 2400 |
| Die (F.) | | 480 |
| Die edge heaters (F.) | | 500 |

The takeaway belt speed was approximately 0.6 feet per minute. Under these conditions, the coalescence distance ($D_c$) was estimated to be within a few (e.g. 1-3) mm of the working face of the die. The thus-formed laterally-coalesced unitary composite foam slab exhibited approximate (average) values of 0.32 g/cc density, 5.8 inch width, and 0.75 inch thickness.

Working Example 5

A shim-stack foaming die was assembled of the type described in the Representative Working Example. A single 1.25" extruder was used to feed the same foamable composition as in the Representative Working Example, to a single cavity and die set of the die, in the same manner as in the Representative Working Example. The foamable composition was processed under the conditions listed in Table 5:

TABLE 5

| Parameter | Value |
|---|---|
| Screw RPM | 102 |
| Zone 1 (F.) | 450 |
| Zone 2 (F.) | 517 |
| Zone 3 (F.) | 500 |
| Adapt (F.) | 500 |
| Necktube (F.) | 520 |
| Die (F.) | 490 |
| Die edge heaters (F.) | 500 |
| Pressure (psi) | 3000 |

The molten extrudate was taken away on a dual belt laminator (Meyer KFE-E 1500; Meyer GmbH, Rötz, Germany), running at 2.5 ft/min. The lower belt extended slightly toward the working face of the die and was positioned a few cm below the working face so that the molten extrudate was collected on the lower belt and then carried into the gap between the lower belt and the upper belt. Two biaxially oriented PET films were unwound into the dual belt laminator so that the molten extrudate/incipient foam was sandwiched between upper and lower PET films, with a PET film being laminated to each major surface of the resulting PET foam. The surface of each PET film that was contacted with the molten extrudate had been flashlamped in the general manner disclosed in U.S. patent application Ser. No. 14/363,132, entitled "Methods of Bonding Polyester Substrates".

The dual-belt laminator was operated under the conditions listed in Table 6:

TABLE 6

| Parameter | Value |
|---|---|
| Belt height (mm) | 12 |
| Internal nip (mm) | 1.5 |
| Laminator Zone 1 (C.) | 190 |
| Laminator Zone 2 (C.) | 120 |
| Laminator Zone 3 (C.) | 23 |

The belt height is the separation distance between the top and bottom belts of the dual belt laminator. The dual belt laminator has an internal nip approximately halfway in its length. The internal nip parameter is defined as the amount the nip is compressing the belts. For example a belt height of 10 mm sets the gap at 10 mm, and with a 1 mm internal nip setting, the gap at the nip is then set to 9 mm.

The thus-formed laterally-coalesced unitary foam slab exhibited approximate (average) values of 0.40 g/cc density (of the foam core), 6.0 inch width, and 0.25 inch thickness (having been constrained by the belts of the dual-belt laminator, from expanding to the same degree as in e.g. the Representative Working Example).

Working Example 6

A shim-stack foaming die was assembled of the type described Working Example 4. First and second compositions of the same compositions as in Working Example 4, were processed by way of first and second extruders. However, rather than the first and second flowstreams feeding different die cavities/sets of die orifices, the first (foamable) molten flowstream and the second (non-foamable, PET-G) molten flowstream were combined at a common inlet to the die to form a multilayer flowstream comprising an inner layer (akin to layer 1011 of FIG. 9) that was a foamable composition, and upper and lower layers (akin to layers 1012 and 1013 of FIG. 9) of PET-G. The first and second compositions were processed, with the resulting molten extrudate being collected in a dual-belt laminator along with top and bottom layers of flashlamped PET film (in similar manner as in Working Example 5), under the conditions listed in Table 7:

TABLE 7

|  | 1$^{st}$ Extruder/composition | 2nd Extruder/composition |
|---|---|---|
| Screw RPM | 90 | 22 |
| Zone 1 (F.) | 437 | 450 |
| Zone 2 (F.) | 511 | 505 |
| Zone 3 (F.) | 539 | 530 |
| Adapt (F.) | 517 | 500 |
| Necktube (F.) | 511 | 511 |
| Pressure (psi) | 2740 | 3350 |
| Die (F.) |  | 480 |
| Die edge heaters (F.) |  | 500 |
| Belt speed (ft/min) |  | 1.65 |
| Zone 1 top (° C.) |  | 140 |
| Zone 1 bottom (° C.) |  | 130 |
| Zone 2 top (° C.) |  | 140 |
| Zone 2 bottom (° C.) |  | 130 |
| Belt Height (mm) |  | 11.5 |
| Internal nip (mm) |  | 1 |

The flashlamped PET films were thus laminated to PET-G surface layers that were present on each major surface of the thus-formed foam slab. The thus-formed laterally-coalesced unitary composite foam slab (bearing PET films laminated thereto) exhibited approximate (average) values of 0.45 g/cc density (of the foam core), 3.0 inch width, and 0.375 inch thickness.

Working Example 7

A shim-stack foaming die was assembled of the type described in the Representative Working Example. A foamable composition was prepared, comprising high melt strength polypropylene (Borealis WB140HMS) at 96 wt. %, and a chemical blowing agent (EcoCell Chemical Blowing Agent; Polyfil, Rockaway, N.J.) at 4 wt. %. The foamable composition was processed under the conditions listed in Table 8:

TABLE 8

| Parameter | Value |
|---|---|
| Screw RPM | 100 |
| Zone 1 (F.) | 350 |
| Zone 2 (F.) | 420 |
| Zone 3 (F.) | 400 |
| Adapt (F.) | 400 |
| Necktube (F.) | 390 |

TABLE 8-continued

| Parameter | Value |
|---|---|
| Die (F.) | 390 |
| Die edge heaters (F.) | 390 |
| Pressure (psi) | 3680 |

The molten extrudate was taken away on the dual belt laminator, running at 2.7 ft/min. The lower belt extended slightly toward the working face of the die and was positioned a few cm below the working face so that the molten extrudate was collected on the lower belt and then carried into the gap between the lower belt and the upper belt. Two glass-fiber-reinforced polypropylene (GFPP) films were unwound into the dual belt laminator so that the molten extrudate/incipient foam was sandwiched between upper and lower GFPP films, with each GFPP film laminated to a major surface of the molten extrudate. (The GFPP films had been made using Borealis Fibremod GB306SAF (35 wt. % glass fibers) resin pellets in standard cast film extrusion equipment (single screw extruder, 3-roll casting station, and winder.) The thus-formed laterally-coalesced unitary foam slab (with GFPP films laminated thereto) exhibited approximate (average) values of 0.50 g/cc density (of the foam core), 2.5 inch width, and 0.375 inch thickness.

The foregoing Examples have been provided for clarity of understanding only, and no unnecessary limitations are to be understood therefrom. The tests and test results described in the Examples are intended to be illustrative rather than predictive, and variations in the testing procedure can be expected to yield different results. All quantitative values in the Examples are understood to be approximate in view of the commonly known tolerances involved in the procedures used. It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document incorporated by reference herein, this specification as written will control.

What is claimed is:

1. A method of making a unitary foam slab, the method comprising:

continuously emitting molten foamable extrudate flowstreams through at least selected die orifices of a plurality of die orifices of a foaming die
wherein the foaming die comprises a plurality of shims that are layered together under pressure to form a shim stack, the shims combining to collectively define the plurality of die orifices in a working face of the foaming die and to collectively define at least one die cavity that is configured to receive a molten foamable composition from an extrusion apparatus and that is fluidly connected to the die orifices, and,
allowing the molten foamable extrudate flowstreams to foam, to coalesce and to solidify as a unitary mass so as to form a unitary foam slab with a slab width and a slab thickness.

2. The method of claim 1 wherein the shim stack is comprised of at least about twenty shims.

3. The method of claim 1 wherein the shim stack is comprised of at least about two hundred shims.

4. The method of claim 1 wherein the die orifices of the plurality of die orifices are spaced in a single row along a lateral axis of the foaming die.

5. The method of claim 1 wherein the die orifices each exhibit an elongated shape with a long axis that is oriented at least substantially orthogonal to a lateral axis of the foaming die and that is at least substantially aligned with a height axis of the foaming die, and wherein the die orifices each exhibit an orifice height to orifice width aspect ratio of at least about 4:1.

6. The method of claim 1 wherein each shim of the plurality of shims exhibits a major plane that is at least substantially parallel to a thickness axis of the foaming die.

7. The method of claim 1 wherein the plurality of shims includes a first shim set of orifice shims, each orifice shim comprising at least one open-ended cutout that defines a height of a die orifice and that defines a lateral slice of the at least one die cavity; and, wherein the plurality of shims includes a second shim set of spacer shims, each of which spacer shims does not comprise an open-ended cutout that defines a height of a die orifice but does comprise at least one closed-ended cutout that defines a lateral slice of the at least one die cavity.

8. The method of claim 7 wherein at least selected orifice shims are each present as a single orifice shim between a pair of nearest-neighbor spacer shims, and wherein each selected orifice shim comprises a thickness that defines an orifice width of at least one die orifice.

9. The method of claim 7 wherein at least selected orifice shims are each present as a bundle of multiple orifice shims without a spacer shim being present between any of the orifice shims of the bundle of multiple orifice shims, and wherein a combined thickness of the orifice shims of the bundle of orifice shims defines an orifice width of at least one die orifice.

10. The method of claim 7 wherein at least selected spacer shims are each present as a single spacer shim between a pair of nearest-neighbor orifice shims, and wherein each selected spacer shim comprises a thickness that defines a lateral edge-to-edge distance between nearest lateral edges of a pair of nearest-neighbor die orifices.

11. The method of claim 7 wherein at least selected spacer shims are each present as a bundle of multiple spacer shims without an orifice shim being present between any of the spacer shims of the bundle of multiple spacer shims, and wherein a combined thickness of the spacer shims of the bundle of spacer shims defines a lateral edge-to-edge distance between nearest lateral edges of a pair of nearest-neighbor die orifices.

12. The method of claim 1 wherein the shims combine to collectively define a first set of die orifices in the working face of the foaming die and to collectively define a first die cavity that is configured to receive a first molten foamable composition from an extruder that is fluidly connected to the first set of die orifices; and, wherein the shims combine to collectively define a second set of die orifices in the working face of the foaming die and to collectively define a second die cavity that is configured to receive a second molten composition from an extruder that is fluidly connected to the second set of foaming die orifices.

13. The method of claim 12 wherein the second die cavity is configured to receive a second molten composition from a second extruder that is a different extruder than the extruder from which the first die cavity is configured to receive a first molten foamable composition; and, wherein the second molten composition is a densified molten composition.

14. The method of claim 12 wherein at least selected die orifices of the second set of die orifices are each laterally sandwiched in between a pair of die orifices of the first set of die orifices.

15. The method of claim 1 wherein the die orifices are laterally-aligned die orifices.

16. The method of claim 1 wherein the foaming die is fluidly coupled to an extrusion apparatus that comprises at least one extruder and that is configured to continuously supply a molten foamable flowstream to at least one die cavity of the foaming die.

17. The method of claim 1 wherein the plurality of shims includes a first shim set of orifice shims, each orifice shim comprising at least one open-ended cutout that defines a height of a die orifice and that defines a lateral slice of the at least one die cavity; and, wherein the at least one open-ended cutout comprises, at a terminal end of the open-ended cutout that is substantially opposite the open end of the open-ended cutout, a comb structure comprising a linear array of teeth with spaces interspersed therebetween.

18. The method of claim 1 wherein the molten foamable composition comprises a blowing agent.

* * * * *

UNITED STATES PATENT AND TRADEMARK OFFICE
CERTIFICATE OF CORRECTION

PATENT NO. : 10,421,227 B2  
APPLICATION NO. : 15/517022  
DATED : September 24, 2019  
INVENTOR(S) : Jeff Kalish Page 1 of 1

It is certified that error appears in the above-identified patent and that said Letters Patent is hereby corrected as shown below:

In the Specification

Column 6  
Line 14, delete "($d_e$)" and insert -- ($d_c$) --, therefor.

Column 9  
Line 30, delete "Use," and insert -- Use (attorney docket number 75735US002), --, therefor.

Column 10  
Line 52, delete "Slab," and insert -- Slab (attorney docket number 75789US002), --, therefor.

Column 12  
Line 64, delete "Use." and insert -- Use (attorney docket number 75735US002). --, therefor.

Column 13  
Line 18, delete "shims" and insert -- shims. --, therefor.  
Line 20, delete "shims" and insert -- shims. --, therefor.

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*